(12) United States Patent
Schnaufer et al.

(10) Patent No.: US 6,636,558 B1
(45) Date of Patent: Oct. 21, 2003

(54) MULTIPATH MITIGATION APPROACH FOR SPREAD SPECTRUM RANGING/POSITIONING SYSTEMS

(75) Inventors: Bernard A. Schnaufer, Marion, IA (US); Gary A. McGraw, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/386,067

(22) Filed: Aug. 30, 1999

(51) Int. Cl.$^7$ ............................................. H04B 1/713
(52) U.S. Cl. ........................................................ 375/150
(58) Field of Search ................................. 375/130, 140, 375/142, 144, 148, 150

(56) References Cited

U.S. PATENT DOCUMENTS

| | | | | |
|---|---|---|---|---|
| 3,943,346 A | * | 3/1976 | Urkowitz et al. | 708/290 |
| 4,578,678 A | * | 3/1986 | Hurd | 342/357.12 |
| 5,347,536 A | * | 9/1994 | Meehan | 375/148 |
| 5,726,659 A | * | 3/1998 | Kee et al. | 342/352 |
| 5,809,064 A | | 9/1998 | Fenton et al. | 375/208 |

OTHER PUBLICATIONS

"Multipath Corrections for a GPS Receiver" by Charles R. Cahn and Mangesh M. Chansarkar, presented at ION GPS 97, Kansas City, Mo., Sep. 1997.
"A Practical Approach to the Reduction of Pseudorange Multipath Errors in a L1 GPS Receiver" by Bryan R. Townsend and Patrick C. Fenton, presented at ION GPS–94, Salt Lake City, Sep. 20–23, 1994.
"Performance Evaluation of the Multipath Estimating Delay Lock Loop" by Bryan R. Townsend, D. J. Richard Van Nee, Patrick C. Fenton, and Keith J. Van Dierendonck, presented at ION National Technical Meeting, Anaheim, California, Jan. 18–20, 1995.
"The Multipath Estimating Delay Lock Loop Approaching Theoretical Accuracy Limits", by Richard D. J. Van Nee and Jaap Siereveld, presented at the IEEE Position, Location and Navigation Symposium, Las Vegas, Nevada, Apr. 1994.
"L1 Carrier Phase Multipath Error Reduction Using MEDLL Technology", by Bryan R. Townsend, Patrick C. Fenton, Keith J. Van Dierendonck, presented at ION Palm Springs, California, Sep. 13–15, 1995.
"Theory and Performance of Narrow Correlator Spacing in a GPS Receiver" by A. J. Van Dierendonck, Pat Fenton and Tom Ford, published in NAVIGATION: Journal of The Institute of Navigation, vol. 39, No. 3, Fall 1992.

* cited by examiner

*Primary Examiner*—Stephen Chin
*Assistant Examiner*—Kevin Kim
(74) *Attorney, Agent, or Firm*—Nathan O. Jensen; Kyle Eppele

(57) ABSTRACT

An apparatus and method for mitigating multipath interference in a spread spectrum ranging/positioning system receiver is disclosed. Improved peak tracking in the presence of multipath interference is accomplished with an improved discrimiriant. The discriminant may be developed from a curvilinear function based on a minimal number of correlators. Also disclosed is an open loop measurement compensation innovation that compensates for a multipath-induced shift of the correlation function peak. The positioning system receiver may have either one or both of the mitigation features.

17 Claims, 8 Drawing Sheets

MULTIPATH MITIGATION APPROACH FOR SPREAD SPECTRUM RANGING/POSITIONING SYSTEMS

FIELD OF THE INVENTION

The present invention generally relates to the mitigation of multipath interference in spread spectrum ranging systems, and even more particularly relates to methods and apparatuses for mitigating multipath interference in Global Positioning System receivers.

BACKGROUND OF THE INVENTION

Spread spectrum positioning systems, such as the Global Positioning System (GPS) operated by the United States government or the Federation of Russia's Global Orbiting Navigating Satellite System (GLONASS), are well known. Receivers have been developed that make use of positioning system signals for navigational and other applications. Navigational receivers, for example, serve land, sea and air transportation applications. Land applications include uses by ground vehicles and hand-carried uses by individuals. Other types of applications include surveying, geodetic control or plate tectonic studies. Yet other related positioning system applications serve telecommunication facilities, laboratories, astronomical observatories and other such facilities requiring precise timing or accurate frequencies.

The accuracy of the results obtained by a positioning system receiver is dependent on the quality of the received signal. The received signal, however, is often distorted by the presence of multipath interference. The environment surrounding the receiver determines the existence and characteristics of any received multipath signals. Hence, significant error can be introduced even in a differential GPS system. When multipath interference is present, the positioning and timing solutions calculated by the receiver are less accurate and the usefulness of the system is diminished.

In a GPS-type positioning system, multipath interference results in a distortion of the received pseudorandom noise (PRN) signal, which in turn leads to a distortion of the correlation function. The correlation function is the function obtained from the correlation of an internal, receiver-generated version of the PRN code with a received satellite-generated signal. Multipath-induced distortion causes a conventional code tracking loop in the receiver, for example a code tracking loop using an early-minus-late discriminant, to incorrectly identify the correlation function peak. The multipath-induced distortion causes the location of the correlation function peak to be shifted. Since pseudorange (PR) measurements are derived from the time associated with the correlation peak, a shifted or an incorrectly identified correlation peak leads to an incorrect position and time solution. The incorrect solutions arise because the multipath interference does not cause all of the received PRN signals to be shifted in exactly the same manner.

The multipath interference problem is well known in the art and various responses have been devised to deal with it. One approach has been via antenna design innovations, such as choke ring ground planes. A related approach involves careful selection of the receiver antenna site. Such approaches, however, are often impractical. In many applications, for example, the receiver and antenna must be capable of mobile operation in uncontrolled environments.

Multipath interference has also been addressed by attempting to better locate the correlation function peak or the peak of a multipath-free correlation function. One attempt involved modification of the early-minus-late (EmL) discriminant of the code tracking loop. Since the absolute values of the slopes on each side of the correlation peak are not equivalent when multipath interference is present, the EmL discriminate does not track the peak accurately.

The EmL discriminant was modified to take the different slopes into account. The modified approach is often called the Early-Late-Slope (ELS) technique. The ELS technique uses two correlators on each side of the peak to estimate the slopes on each side. The two lines formed by the pairs of correlators intersect at a point. The point of intersection is used as the estimate of the peak of the correlation function. A failing of the ELS technique, however, is that it does not take into account the rounding of the correlation function by the receiver's front-end filtering.

Yet another multipath mitigation technique involves measurement of the correlation function and the estimation therefrom of the underlying direct and multipath signal parameters (amplitude, phase and time delay). The estimated multipath signals are separated from the correlation function and the remaining function is taken as an estimate of the direct signal.

The method of reducing the correlation function into estimated direct and multipath components is problematic for several reasons. First, for example, the approach requires implementation of a model predicting the multipath environment that the receiver will experience. For instance, the model may assume that a specified maximum number of multipath reflections will be received with every direct signal. The model, for example, may be constructed to solve for a direct signal and two related multipath signals. Such an approach may provide acceptable performance when the circumstances expected by the model match the environment actually experienced by the receiver. When operating conditions conflict with the model's assumptions, however, the performance of the system is degraded.

Further, implementation of such an approach requires significant hardware and software overhead. A plurality of correlators, sometimes ten or more, are required for a single tracking channel. A typical receiver, such as one employing an EmL technique, would use only two or three correlators per tracking channel. The increased number of correlators requires additional software processing and additional hardware.

Consequently, there is a need for improved methods and apparatuses for mitigating for the effects of multipath interference. Methods and apparatuses are needed which compensate for the multipath-induced shift of the correlation function peak. In addition, improved correlation function peak tracking is needed. Such improvements would desirably include an approach for measuring multipath bias that requires only a small number of correlators per channel.

SUMMARY OF THE INVENTION

It is an object of the present invention to provide a spread spectrum positioning system receiver capable of determining present position with enhanced precision.

It is a feature of the present invention to mitigate the presence of multipath interference in a received spread spectrum pseudo-random coded ranging signal.

It is an advantage of the present invention to provide a multipath mitigation approach requiring only a small number of correlators per channel.

The present invention is an apparatus and method for mitigating multipath interference in a spread spectrum ranging signal received by a positioning system receiver. The invention is designed to satisfy the aforementioned needs, provide the previously stated objects, include the above-listed features and achieve the articulated advantages. The present invention is carried out, using a limited number of correlators, in a manner that does not require establishment of assumptions concerning the receiver's future operational environment.

Accordingly, the present invention is a positioning system receiver that mitigates multipath-induced errors by improved peak tracking, by peak shift compensation, or by a combination of both techniques, to provide more accurate timing and positioning solutions.

BRIEF DESCRIPTION OF THE DRAWINGS

The invention may be more fully understood by reading the following description of the preferred embodiments of the invention, in conjunction with the appended drawings wherein.

DETAILED DESCRIPTION

The present invention will be described within the context of a GPS positioning system. It is important to note, however, that the referred to GPS receivers and system are merely an example of one type of wide area spread spectrum positioning system that can include the present invention. Other similar navigation systems, such as GLONASS, can also be used with the present invention. Any other system that employs peak tracking of a pseudorandom ranging code and is vulnerable to multipath interference is intended to be included within the scope of the present invention.

Figure 1:
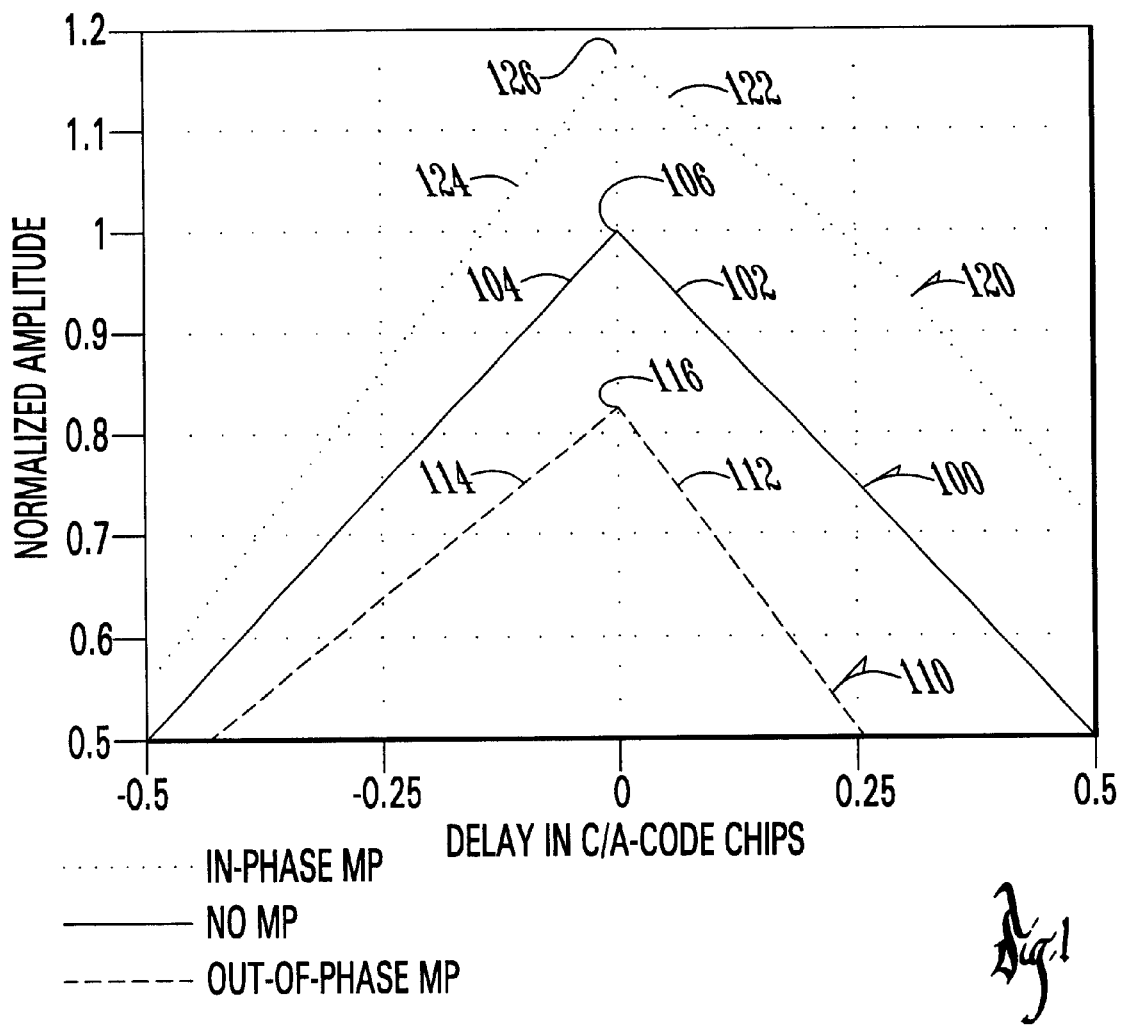
FIG. 1 is a graphical depiction of the effects of multipath interference on a correlation function for the case where the transmitted signal and the receiver front-end filtering have very wide bandwidth.

Now referring to the drawings, wherein like numerals refer to like matter throughout, there is shown in FIG. 1 a graphical depiction of the effects of multipath interference on a correlation function. FIG. 1 illustrates such effects in the absence of the peak rounding complication introduced by the typical receiver's front-end filtering. In FIG. 1, the front-end filtering has a very wide bandwidth.

The correlation function 100 depicts a correlation function resulting from reception of a direct signal with no accompanying multipath interference. In FIG. 1, the carrier signal has already been removed by the carrier tracking loop. The absolute value of the slopes of the two segments 102, 104 leading to the function peak 106 are equivalent.

The correlation function 110 depicts a correlation function resulting from reception of a direct signal and an accompanying multipath signal that is out of phase with the direct signal. The multipath interference of FIG. 1 involves a single multipath reflection signal having an amplitude of +/−0.25 and a delay relative to the direct signal of 0.3 C/A-code chips. In the out-of-phase instance, the absolute value of the slopes of the two segments 112, 114 leading to the function peak 116 are obviously not equivalent.

Finally, the correlation function 120 depicts a correlation function resulting from reception of a direct signal and an accompanying multipath signal that is in phase with the direct signal. The multipath signal has the same amplitude and relative delay as in the case of the out-of-phase instance. As expected, the absolute value of the slopes of the two segments 122, 124 leading to the function peak 126 are not equivalent. This is significant since the peak of the correlation function 106, 116, 126 is conventionally determined by methods that assume the correlation function is symmetric about the peak.

In each of the three correlation functions 100, 110, 120 of FIG. 1, however, the peak occurs at the same time. The multipath interference results in no shifting of the function peak. As a result, the pseudorange measurements are not affected by the presence of the multipath signals.

Figure 2:
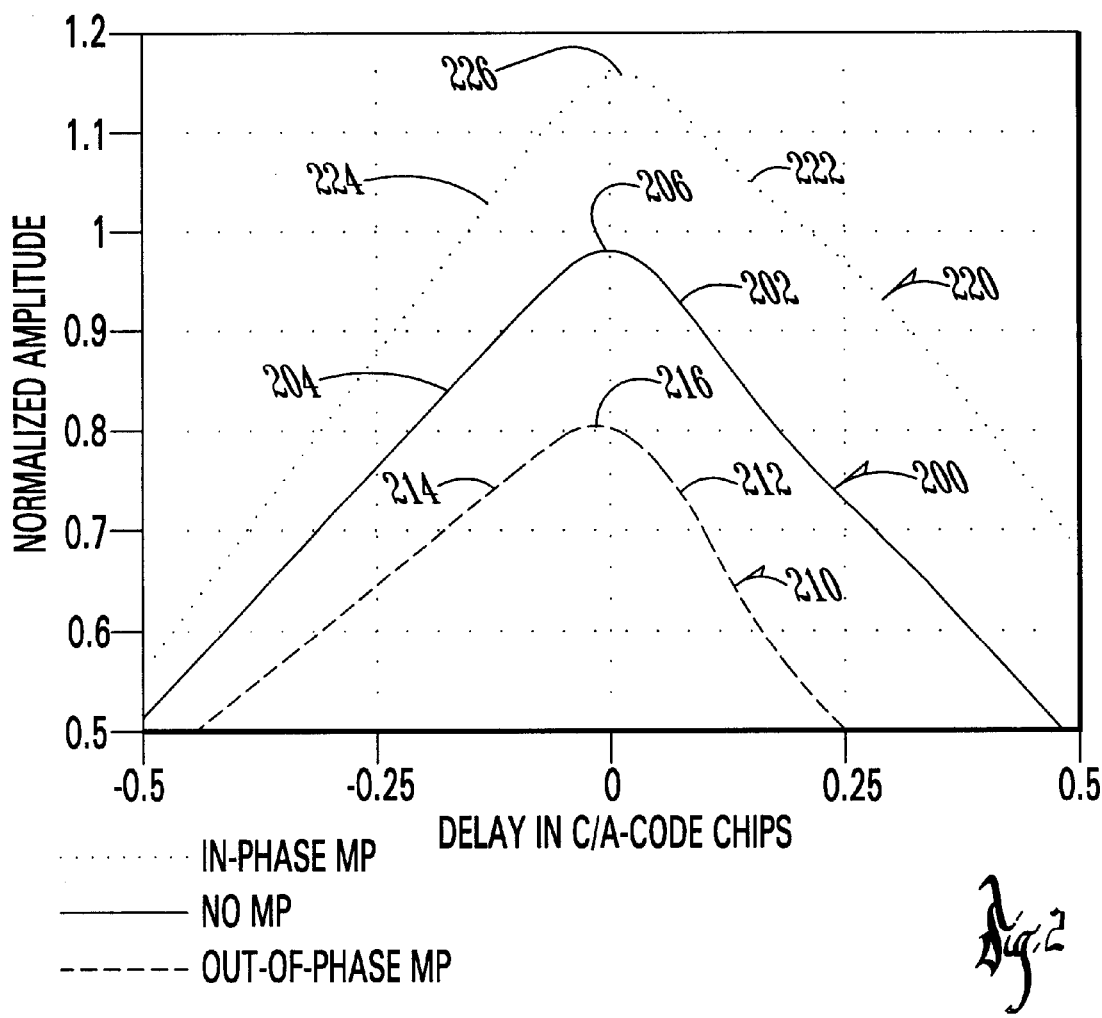
FIG. 2 is a graphical depiction of the effects of multipath interference on a correlation function for a typical receiver, the front-end filtering having significantly less bandwidth than the receiver of FIG. 1.

Now referring to FIG. 2, there is shown another graphical depiction of the effects of multipath interference on a correlation function. FIG. 2 illustrates the effects of such interference when the receiver's front-end filtering has a bandwidth that is significantly smaller than the bandwidth of the receiver of FIG. 1. In FIG. 2, the receiver's front-end bandwidth is 4 MHz. Here, the peaks of the various correlation functions are visibly rounded.

The intermediate amplitude correlation function 200 of FIG. 2 depicts a correlation function resulting from reception of a direct signal with no accompanying multipath interference. As in FIG. 1, the carrier phase of the signal has already been removed by the carrier tracking loop. The correlation function peak 206 is located at the 0 (zero) Delay point of FIG. 2. In contrast to the intermediate amplitude correlation function 100 of FIG. 1, the peak of correlation function 200 is rounded. Distortions in the shape of the correlation function 200 are common to all satellite signals so that tracking biases are absorbed as part of the receiver clock bias in the navigation solution.

The lower amplitude correlation function 210 depicts a correlation function resulting from reception of a direct signal and an accompanying multipath signal that is out of phase with the direct signal. As in FIG. 1, the multipath interference of FIG. 2 involves a single multipath reflection signal having an amplitude of +/−0.25 and a delay relative to the direct signal of 0.3 C/A-code chips. In the out-of-phase instance, the absolute value of the slopes of the two segments 212, 214 leading to the rounded function peak 216 are obviously not equivalent. Since the distortion of the correlation function caused by the multipath affects individual satellites differently, the tracking bias leads to navigation errors.

Finally, the higher amplitude correlation function 220 depicts a correlation function resulting from reception of a direct signal and an accompanying multipath signal that is in phase with the direct signal. The multipath signal has the same amplitude and relative delay as in the out-of-phase instance. As with the lower amplitude correlation function 210, the absolute value of the slopes of the two segments 222, 224 leading to the function peak 226 of the higher amplitude correlation function 220 are not equivalent. Also, the peak 226 has a rounded shape.

In each of the three correlation functions 200, 210, 220 of FIG. 2, the peaks occur at different times. The peak 216 of the lower amplitude correlation function 210 is located to the left of the peak 206 of the intermediate amplitude correlation function 200, which in turn is located to the left of the peak 226 of the higher amplitude correlation function 220. In other words, the peaks 216, 226 of the correlation functions 210, 220 that include the effects of multipath interference are shifted relative to the peak 206 of the correlation function 200 that does not include a multipath signal. Since the correlation function peak 206, 216, 226 provides the common timing reference by which the pseudorange measurements are determined, pseudorange measurements that are based on the shifted peak locations 216, 226 of FIG. 2 will lead to inaccurate timing and positioning solutions.

Figure 3:
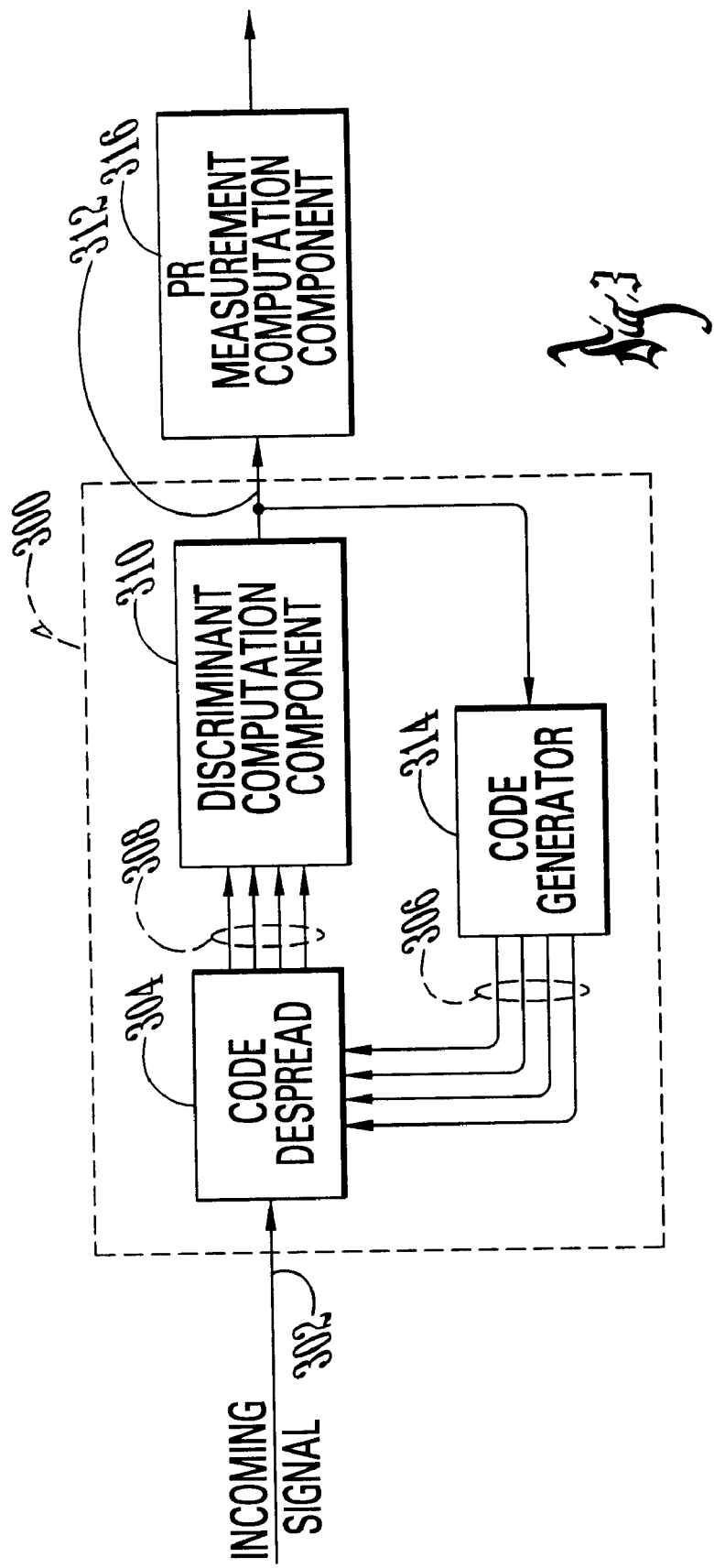
FIG. 3 is a block diagram depicting the peak tracking apparatus of the present invention.

FIG. 3 is a block representation of an apparatus embodying the present invention. The apparatus includes a code tracking loop 300 that accepts a received PRN signal 302 as input. At the Code Despread block 304, the received PRN signal 302 is multiplied by four time-shifted versions of an internally generated PRN code sequence 306. The four product signals are then integrated over the loop update interval to generate four correlator values 308. The received PRN code sequence 302 has typically been generated by an orbiting satellite and received by the positioning system receiver. The role of the code tracking loop 300 is to keep the internally generated PRN code synchronized with the externally generated PRN code.

The code tracking loop 300 includes a discriminant computation component 310. The discriminant computation component 310 reads the value of each of the various correlators. The correlators hold samples taken from the region surrounding a peak of the correlation function signal. As noted, in one embodiment, the discriminant computation component 310 reads the value of each of four equally spaced correlators that are located near a, peak of the correlation function signal. In a code tracking loop 300 operating at 50 Hz, for example, the code tracking loop operations are repeated once every 20 ms.

The discriminant computation component 310 calculates an error signal also known as a discriminant 312. The value of the error signal 312 is used to maintain synchronization. For instance, in one embodiment, if the error signal 312 is zero, the internal and received codes will be deemed synchronized and no tracking adjustments will be made. If the error signal 312 is non-zero, an appropriate proportional adjustment will be made to the internally generated PRN code by a code generation component 314 in order to maintain synchronization. In prior positioning system receivers, for example, an EmL or an ELS discriminant is calculated in the code tracking loop 300. As noted above, however, such techniques will not correctly identify the peak of a rounded correlation function exhibiting the effects of multipath interference. A PR measurement computation component 316 calculates the pseudorange measurements from the discriminant signal provided by the code tracking loop 300.

Figure 4:
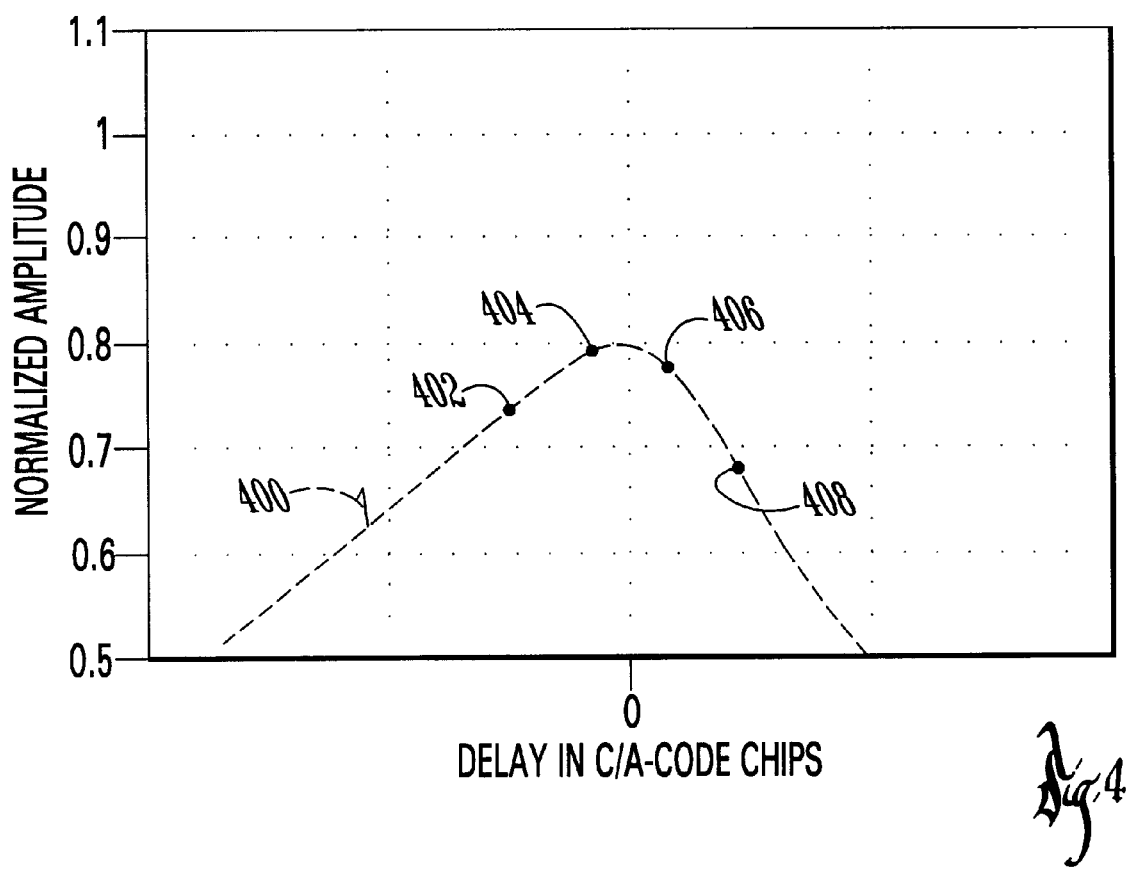
FIG. 4 is a graphical representation of the location of various correlators on a multipath-influenced correlation function.

FIG. 4 illustrates a correlation function 400 that could be input into the apparatus of FIG. 3. Along the correlation function 400 are four equally spaced correlation points 402, 404, 406, 408. The four correlators may be designated, for example, as the "early-early" (Ee) 402, the "early-prompt" (Ep) 404, the "late-prompt" (Lp) 406 and the "late-late" (Ll) 408 correlators.

The use of four correlators is exemplary of only one embodiment of the present invention. Other embodiments of the present invention employ greater numbers of correlators. For example, in other embodiments an apparatus of the present invention would employ five, six or more correlators. Some embodiments may employ ten or more correlators per channel.

The discriminant computation component 310 of the present invention more accurately maintains synchronization by calculating a discriminant based on a cubic curve fit of the rounded correlation function. The cubic curve fit discriminant (CCFD) essentially takes the place of the prior EmL or ELS discriminants. Advantageously, the CCFD can be calculated using only a minimal number of correlators, four correlators for example, and without adding undue computational complexity. Other embodiments of the present invention use a curvilinear function other than a cubic polynomial as the basis for calculating the discriminant. Yet other embodiments of the present invention compute a discriminant based on a curve fit to the correlation function using more than the minimum number of correlators and applying a statistical regression technique to generate the optimal curve fit with higher computational complexity.

Figure 5:
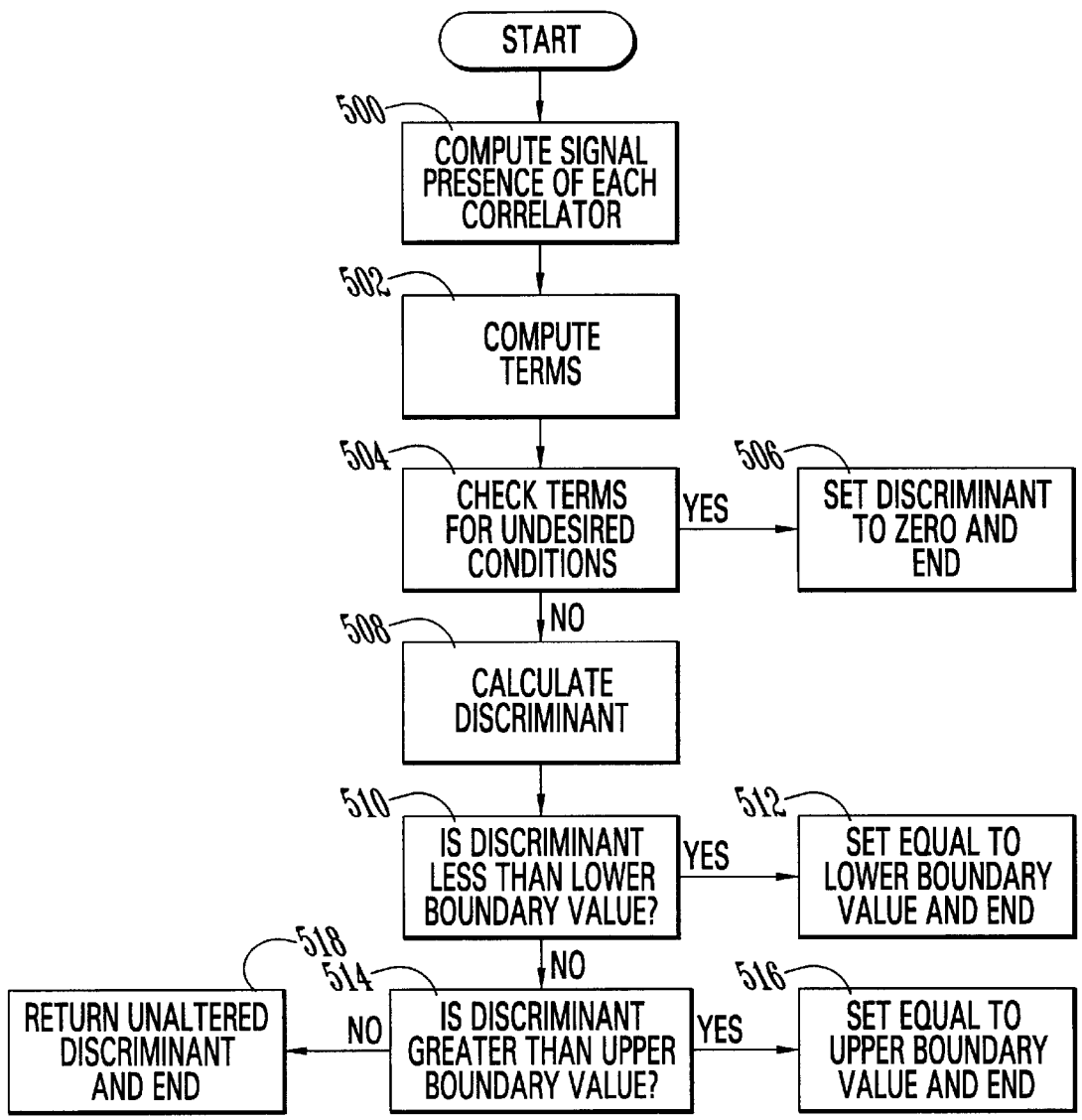
FIG. 5 is a flowchart depicting the operational flow of the peak tracking aspect of the present invention.

The four correlator embodiment of the CCFD will now be described. FIG. 5 is a flowchart depicting the operational flow of the peak tracking aspect of the present invention. First, the magnitude of each of the four correlators is computed 500. In the four correlator case, for example, the four samples are sufficient to completely define a cubic polynomial. The correlation function is generally cubic near its peak.

Let the spacing between adjacent correlators, in units of chips, be represented by the value d/2. The value of d/2 should be significantly less than one chip. In one embodiment, for example, the spacing is $1/20^{th}$ of a chip. (Regarding correlator spacing, it is noted that the amount of additional bias produced by the code tracking loop is smaller when the spacing between the correlators is smaller.) Placement of the correlation function peak at the midpoint of the correlators leads to the following four equations defining the coefficients of the cubic curve fit:

$Ee=D(-3d/4)^3+E(-3d/4)^2+F(-3d/4)+G$ $Ep=D(-d/4)^3+E(-d/4)^2+F(-d/4)+G$ $Lp=D(d/4)^3+E(d/4)^2+F(d/4)+G$ $Ll=D(3d/4)^3+E(3d/4)^2+F(3d/4)+G$ where Ee, Ep, Lp and Ll, representing the magnitudes or signal presence of each of the four correlators, are located at distances of −3d/4, −d/4, d/4 and 3d/4 chips, respectively, from the correlation function peak.

Since the above equations are four linear equations in four unknowns, the cubic coefficients can be determined by a matrix inversion and matrix-column multiplication. The four-by-four matrix that must be inverted, however, is always the same and is known beforehand. Therefore, the cubic coefficients can be determined by matrix-column multiplication.

After the coefficients (D, E, F and G in the previous set of equations) have been computed, the location of the local maximum of the cubic polynomial is determined. The local maximum is the estimate of the peak of the correlation function. The location of the local maximum with respect to the center location of the current correlator positions will serve as the discriminant. The local extrema of a cubic polynomial is found by setting its derivative equal to zero and then solving the equation. The derivative of a cubic polynomial is a quadratic equation having two solutions. The two solutions are:

$$\frac{-E \pm \sqrt{E^2 - 3DF}}{3D}$$

where D is the coefficient of the cubic term, E is the coefficient of the quadratic term and F is the coefficient of the linear term as indicated in the above set of equations.

In the noiseless case, the solution of the quadratic equation giving the position of the local maximum, and thus the correlation function peak, is:

$$\frac{-E - \sqrt{E^2 - 3DF}}{3D}$$

However, when noise is present in the correlator output values, the coefficients of the cubic curve fit can sometimes produce value s for the location of the local maximum that are not well behaved. For instance, the solution may be a very large value or the expression under the square root sign, $E^2 - 3DF$, may be a negative number. A negative value for this expression will cause the solution of the quadratic equation to be an imaginary number. For a 20 ms integration period used to generate the correlator values, ill-behaved solutions will arise very infrequently even for low signal levels. The present invention avoids such solutions by checking the value of the expression under the square root sign and also by placing maximum and minimum bounds on the calculated discriminant.

In order to compute the CCFD in a computationally efficient manner, the aforementioned computations were simplified via straightforward algebraic manipulations to produce the following set of computations. In one embodiment of the present invention, after the step of determining the signal presence of each correlator 500, the following terms are calculated 502:

$A=Ep-Lp+(Ll-Ee)/3.0$ $B=Ee+Ll-Ep-Lp$ $C=(Ee-Ll)/3.0+9.0(Lp-Ep)$ $DIS=B^2-3.0(A)(C)$

Accordingly, after the step of computing the terms 502, the present invention performs the step of checking the DIS term 504. If the value of DIS is found to be less than zero, the discriminant is set to zero and the procedure of FIG. 5 terminates 506. If the value of DIS is greater than zero, the step of calculating the value of the discriminant 508 is performed.

In one embodiment, the step of calculating the discriminant 508 is performed as follows:

$$discrimval = -L\left(\frac{d}{2}\right)\left(\frac{-B - \sqrt{DIS}}{3A}\right)$$

where discrimval is the variable holding the discriminant value, L is an implementation specific constant which scales the discriminant into units appropriate for the local code generation hardware and d/2 represents the correlator spacing between two adjacent correlators.

Finally, the calculated value of the discriminant is checked against the boundary conditions. In the event that value of discrimval is smaller than the lower boundary (–LIM) 510, discrimval is set to the value of the lower boundary and the procedure terminates 512. Similarly, if discrimval is larger than the upper boundary (LIM) 514, discrimval is set to the value of the upper boundary 516. If the value of discrimval falls within the prescribed boundaries, discrimval is returned as the solution without alteration 518. The limiting step is designed to prevent an ill-conditioned situation from producing a discriminant value which would introduce a very large noise spike into the code tracking loop, adversely impacting its tracking performance. Different embodiments use different values for the boundary limits. The values chosen for the limits are dependent upon the hardware implementation of the receiver code generation. The steps of FIG. 5 are performed each time the code tracking loop 300 is repeated.

The present invention therefore provides improved peak tracking without requiring a large number of correlators and without significantly increasing the computational complexity. In addition, the present invention can be implemented using existing receiver hardware components. If desired, the present invention can be implemented purely through software modifications.

An even greater portion of the multipath-induced PR bias error, however, results from the shifting of correlation function peak. An additional correction can be made to mitigate this source of error. This aspect of the present invention makes an open-loop correction to the PR measurement. The correction is open loop in the sense that it is made outside of the code tracking loop 300, FIG. 3.

Other multipath mitigation techniques attempt to eliminate multipath-induced distortion from the correlation function prior to its receipt by the code tracking loop 300. In such schemes, code tracking is performed on a corrected correlation function. In contrast, the present invention performs the code tracking procedure on a multipath-influenced correlation function peak and then removes the multipath-induced bias via an applied correction. The correction factor is based on the amount of multipath-induced bias determined to be present in the correlation function.

The open loop measurement compensation (OLMC) innovation provides a technique requiring only a minimal number of correlators for correcting for the multipath-induced shift of the correlation function peak. Ideally, the Multipath Indicator Function (MPI) is directly proportional to the amount of multipath error that is present in the PR measurements. Since the multipath-induced PR error for a single multipath component having delay values in the range of 0.15 to 0.85 chips is proportional to the amplitude of the reflection ($\alpha$), the MPI should also be proportional to $\alpha$. Also, the MPI should be independent of the signal-to-noise ratio ($C/N_o$).

The derivation of an MPI having the above-described characteristics will now be shown. The following equations establish the correlator amplitude values. The equations are for a receiver having four correlators and an infinite front-end bandwidth so that the received correlation function is an ideal triangle. Further, the receiver is tracking the direct path signal close to the correlation function peak such that, even in the presence of multipath interference, the Ee and Ep correlators are located to the left of the peak and the Lp and Ll correlators are located to the right of the peak. Finally the multipath delay is such that its correlation peak occurs to the right of the Ll correlator location. The correlator amplitude values are then:

$$Ee = [R(-x) + \alpha R(-x - \Delta)]\sqrt{KC/N_0}$$
$$= [1 - x + \alpha(1 - x - \Delta)]\sqrt{KC/N_0}$$
$$Ep = \left[R\left(-x + \frac{d}{2}\right) + \alpha R\left(-x + \frac{d}{2} - \Delta\right)\right]\sqrt{KC/N_0}$$
$$= \left[1 - x + \frac{d}{2} + \alpha\left(1 - x + \frac{d}{2} - \Delta\right)\right]\sqrt{KC/N_0}$$
$$Lp = [R(-x + d) + \alpha R(-x + d - \Delta)]\sqrt{KC/N_0}$$
$$= [1 + x - d + \alpha(1 - x + d - \Delta)]\sqrt{KC/N_0}$$
$$Ll = \left[R\left(-x + \frac{3d}{2}\right) + \alpha R\left(-x + \frac{3d}{2} - \Delta\right)\right]\sqrt{KC/N_0}$$
$$= \left[1 + x - \frac{3d}{2} + \alpha\left(1 - x + \frac{3d}{2} - \Delta\right)\right]\sqrt{KC/N_0}$$

where K is a constant, d/2 is the spacing between adjacent correlators, $\Delta$ is the multipath delay and x is the tracking point of the Ee correlator relative to the peak of the direct signal correlation function. Note that x=3d/4 when the receiver is tracking the peak of the direct signal correlation function.

The preceding four equations can be combined and reduced to yield a linear combination of the four correlator values that is proportional to $\alpha$. Specifically, $$Ep+Ll-(Ee+Lp)=\alpha d\sqrt{KC/N_o}$$

To remove the dependence on $C/N_o$, the following linear combination of the correlator values is used $$Ll+Ee-(Ep+Lp)=d\sqrt{KC/N_o}$$

Finally, the MPI function is obtained by substitution, such that $$MPI=(Ep+Ll-(Ee+Lp))/(Ll+Ee-(Ep+Lp))$$

Figure 6:
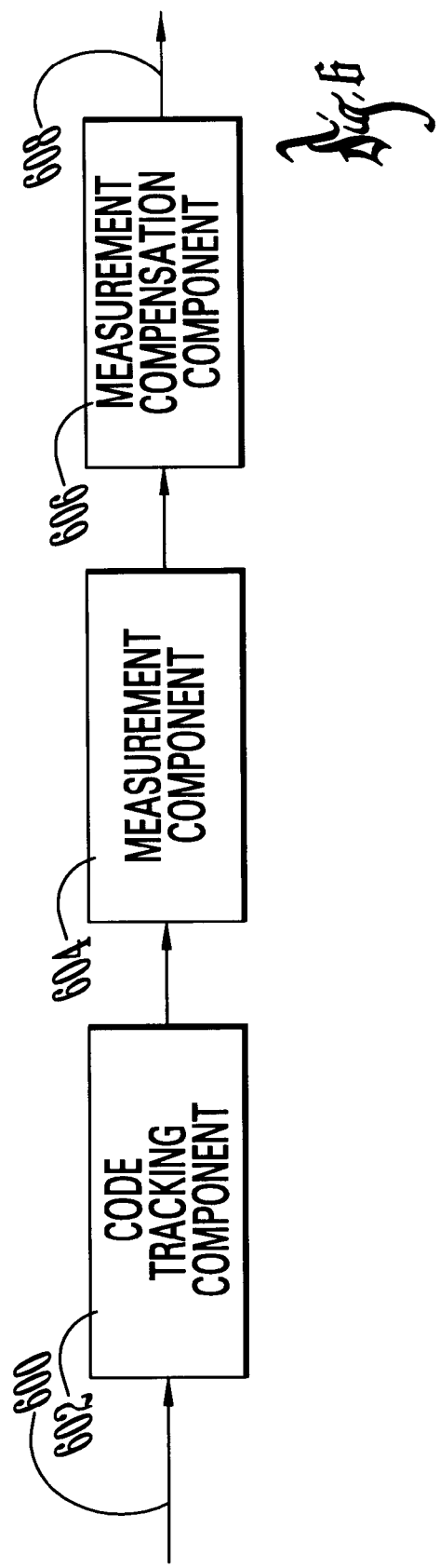
FIG. 6 is a block diagram depicting a preferred location for the open loop measurement compensation apparatus of the present invention.

Referring to FIG. 6, there is shown a block diagram illustrating the location of the OMLC procedure in a tracking and measurement unit of the present invention. FIG. 6 depicts a PRN code 600 being received and processed by a code tracking component 602. In one embodiment, the code tracking component 602 is the code tracking loop 300 as depicted and described in relation to FIG. 3. The code tracking component 602 may employ, for example, an EmL, ELS or CCFD procedure or it can use any other method or apparatus deemed suitable for correlation function peak tracking.

After tracking by the code tracking component 602 is accomplished, the PR measurement is determined by the measurement component 604. Next, the correction to the PR measurement is made by the measurement compensation component 606. The measurement compensation component 606 corrects for the multipath-induced shift of the correlation function peak and outputs a corrected PR measurement 608. In one embodiment, the MPI function derived above supplies the correction factor.

Performance of the OLMC using the above-derived MPI function has demonstrated that, other than for very short delay multipath (delay less than 0.2 chips), the MPI provides an accurate indication of multipath-induced bias regardless of the length of the multipath delay or the number of multipath signals. The described MPI has also proven to be very insensitive to $C/N_o$ levels. Further, as with peak tracking, increased front-end bandwidth results in lowered multipath-induced bias. In contrast to peak tracking, however, decreasing the correlator spacing does not reduce multipath bias when using the OLMC technique.

The relationship between the MPI function and the multipath-induced PR bias is dependent upon the characteristics of the receiver's front-end filter. This relationship must be determined for the particular receiver and MPI function being used. Factors such as temperature and receiver parts tolerances, for example, can affect the performance characteristics of the receiver's front-end filtering. Consequently, the system should be calibrated.

Figure 7:
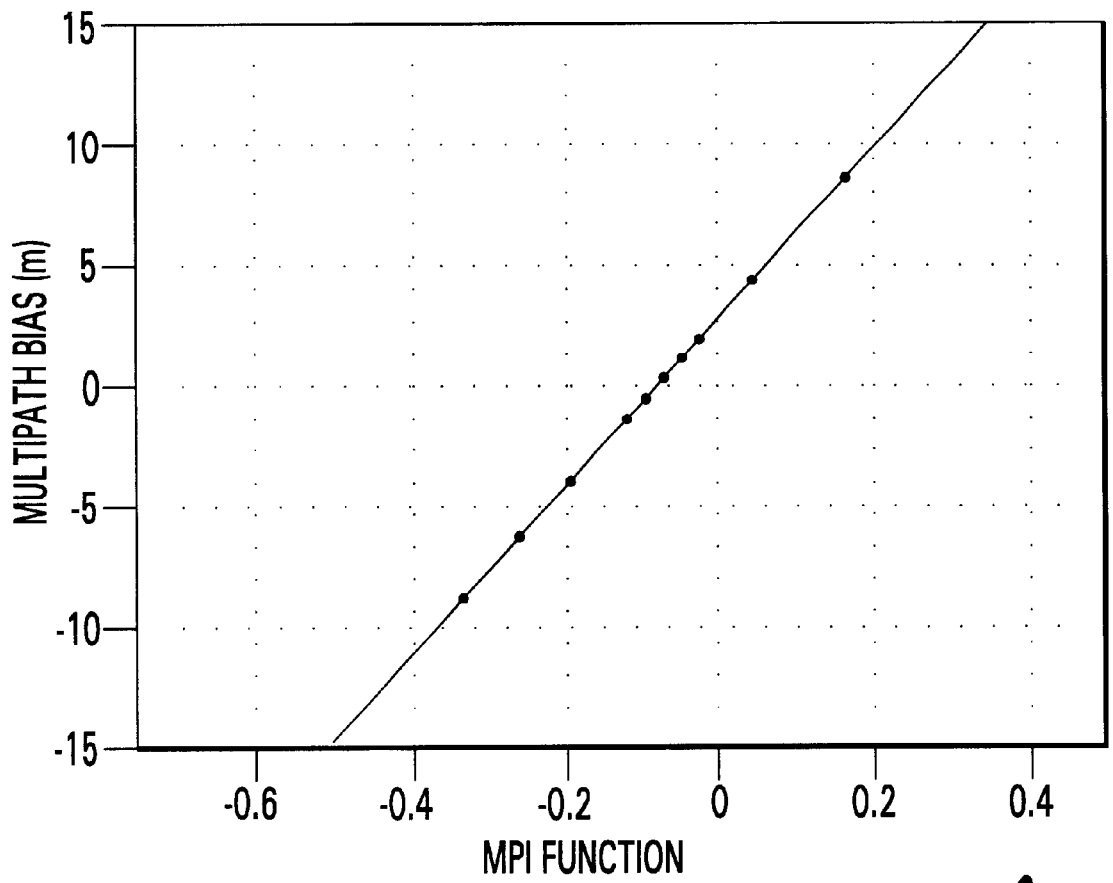
FIG. 7 is a graphical representation of the relationship between bias levels and multipath bias indicator values, including a straight-line interpolation, used for calibration of the open loop measurement compensation technique of the present invention.

To perform a calibration, a single multipath reflection signal with a fixed delay value is generated. The delay value is chosen within the range of delays where the multipath indicator provides consistent results. For the MPI function discussed above, the delay value can be set at approximately 0.5 chips. The amplitude, $\alpha$, of the reflection is varied and different levels of multipath bias are thereby generated. Both the bias and the average value of the MPI function are recorded to produce an empirical relationship. Once the relationship has been determined for a sufficient number of discrete points, a straight-line interpolation is used to determine the intermediate points. An example of the relationship between the bias level and the MPI value, including the straight-line interpolation, is illustrated in FIG. 7. The example of FIG. 7 involves a 4 MHz receiver bandwidth, a $\frac{1}{20}$ correlator spacing, a NEB of 1 Hz and a delay of 0.5 chips.

Depending upon the application and the receiver at issue, a calibration may need to be performed for each unit upon manufacture. In certain circumstances, a single calibration scheme may work for a given family of receivers. Further, some applications may require a temperature-based calibration.

Figure 8:
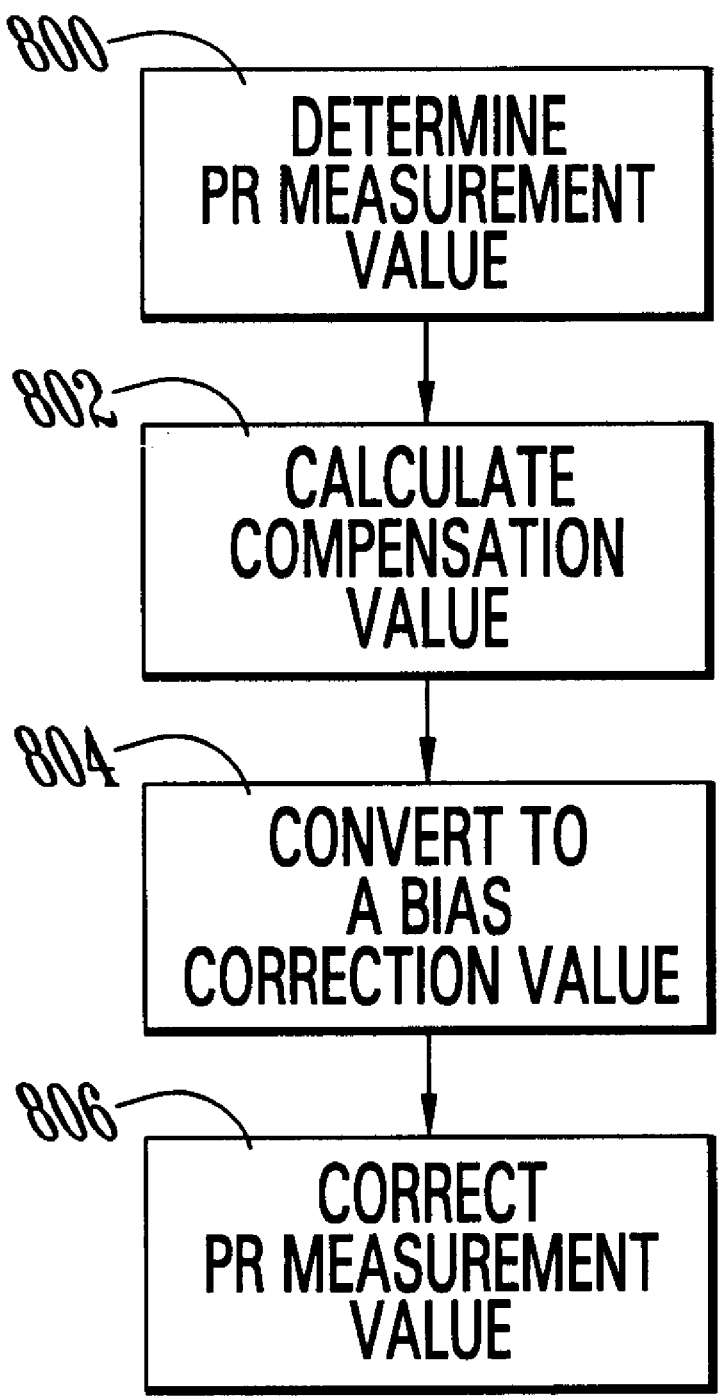
FIG. 8 is a flowchart depicting the operational flow of the open loop measurement compensation aspect of the present invention.

FIG. 8 is a flowchart depicting the operational flow of the OLMC approach. First, the step of determining the PR measurement value 800 is performed. Next, the step of calculating the compensation value 802 is performed. For example, a calculation of the MPI value obtained from the MPI function disclosed above is performed during this step. In the conversion step 804, calibration data, for example data such as that discussed in relation to FIG. 7, is applied to convert the compensation value into a bias correction value. Finally, the step of correcting for the multipath bias 806 is performed by offsetting the PR measurement value by the amount of the bias correction value.

Thus, a positioning system receiver is provided that can better track the peak of a multipath-influenced correlation function, that can compensate for a multipath-induced shift of the correlation function peak, or that can provide both benefits. The benefits are provided while using only a small number of correlators. Further, the innovations described herein can be implemented without an undue increase in computational or hardware complexity.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The form herein described is merely an exemplary embodiment thereof.

We claim:

1. A method of tracking a peak of a correlation function in a positioning system receiver, comprising the steps of:
   sampling a correlation function and obtaining at least four correlation points along the correlation function;
   generating an error signal based upon a computation of a local maximum value of a curvilinear function that passes through the at least four correlation points;
   limiting the generated error signal's magnitude to a boundary value; and
   adjusting a receiver-generated pseudorandom noise code based on the error signal.

2. The method of claim 1 wherein the curvilinear function of said generating step comprises a cubic polynomial function.

3. The method of claim 2 wherein said generating step further comprises calculating the local maximum value by solving a derivative equation of said cubic polynomial function when the derivative equation is set to zero.

4. The method of claim 1 wherein said generating step also includes a checking step determining whether an imaginary number will be generated in the computation of the error signal, said checking step setting the error signal to a default value upon determining that an imaginary number will be generated.

5. The method of claim 1 further comprising a measuring step, following said generating step, determining a pseudorange measurement and compensating for multipath interference present in the determined pseudorange measurement.

6. A positioning system receiver comprising:
   a code tracking component;
   a pseudorange measurement component determining a pseudorange measurement from correlation function signals received from said code tracking component; and
   a measurement compensation component removing multipath-induced bias from the pseudorange measurement determined by said pseudorange measurement components;
   wherein said code tracking component comprises a computation component sampling magnitudes of at least four correlators, and wherein said measurement compensation component removes multipath-induced bias with a multipath indicator function, the multipath indicator function containing the sampled correlator magnitudes as terms.

7. A positioning system receiver according to claim 6 wherein said measurement compensation component removes mulitpath-induced bias with a multipath indicator function that is proportional to a multipath signal's amplitude.

8. A positioning system receiver according to claim 6 wherein said multipath indicator function is $(Ep+Ll-(Ee+Lp))/(Ll+Ee-(Ep+Lp))$ and wherein Ee, Ep, Lp and Ll are the magnitudes of the sampled correlators.

9. A positioning system receiver according to claim 6 wherein said code tracking component comprises:
   a code despread block capable of generating at least four samples along a correlation function;
   a computation component, programmed to calculate a local maximum value of a curvilinear function defined by samples generated by said code despread block, said computation component generating an error signal based on the calculated local maximum wherein a pseudorandom noise code generator is adjusted based on the error signal received from said computation component.

10. A method of compensating for multipath interference in a positioning system receiver comprising the steps of:
    tracking a correlation function peak by sampling at least four correlator magnitudes along the correlation function;
    determining a pseudorange measurement based on the tracked correlation function peak;
    calculating a multipath compensation value by computing a function containing the sampled correlator magnitudes as terms; and
    adjusting the determined pseudorange measurement by an amount indicated by said calculating step.

11. The method of claim 10 wherein the step of tracking further comprises the steps of:
    sampling the correlation function and obtaining at least four correlation points along the correlation function;
    generating an error signal based upon a computation of a local maximum value of a curvilinear function that passes through th eat least four correlation points; and
    synchronizing, with the aid of the error signal, a receiver-generated pseudorandom noise code to a received pseudorandom noise code.

12. The method of claim 10 wherein said calculating step calculates the multipath compensation value by calculating a multipath indicator function.

13. The method of claim 10 wherein the function containing the sampled correlator magnitudes comprises $(Ep+Ll-(Ee+Lp))/(Ll+Ee-(Ep+Lp))$ and wherein Es, Ep, Lp and Ll are the magnitudes of the sampled correlators.

14. The method of claim 10 wherein said calculating step comprises converting said mnultipath compensation value into a bias correction value by use of calibration data, the bias correction value being used in said adjusting step to adjust the pseudorange measurement.

15. A positioning system receiver comprising:
    code tracking means for synchronizing a receiver-generated positioning code with a received positioning code wherein said code tracking means comprises generating means for generating magnitudes of at least four samples of a correlation function:
    ranging measurement means for determining ranging measurements from a correlation function signal received from said code tracking means; and
    measurement compensation means for removing multipath-induced bias from ranging measurements determined by said ranging measurement means wherein said measurement compensation means removes multipath-induced bias with a multipath indicator function, the multipath indicator function containing the generated correlator magnitude as terms.

16. A positioning system receiver according to claim 15 wherein said measurement compensation means removes multipath-induced bias with a multipath indicator function.

17. A positioning system receiver according to claim 15 wherein said multipath indicator function is $(Ep+Ll-(Ee+Lp))/(Ll=Ee-(Ep+Lp))$ and wherein Ee, Ep, Lp and Ll are the magnitudes of the sampled correlators.

* * * * *